United States Patent
Nenov et al.

(10) Patent No.: US 7,503,050 B2
(45) Date of Patent: Mar. 10, 2009

(54) TRANSACTION POLYMORPHISM

(75) Inventors: Iliyan N. Nenov, Rousse (BG); Nikolai D. Tankov, Sofia (BG)

(73) Assignee: SAP Aktiengesellschaft, Walldorf (DE)

( * ) Notice: Subject to any disclaimer, the term of this patent is extended or adjusted under 35 U.S.C. 154(b) by 759 days.

(21) Appl. No.: 10/854,107

(22) Filed: May 26, 2004

(65) Prior Publication Data

US 2006/0010026 A1    Jan. 12, 2006

(51) Int. Cl.
*G06F 13/00* (2006.01)

(52) U.S. Cl. .................. 719/311; 707/10; 709/201; 709/217; 709/219; 717/102

(58) Field of Classification Search .............. 719/311; 717/102; 707/10; 709/201, 217, 219
See application file for complete search history.

(56) References Cited

U.S. PATENT DOCUMENTS

| 5,871,971 | A * | 2/1999 | Knapman et al. ............ 718/101 |
| 6,460,058 | B2 * | 10/2002 | Koppolu et al. ............. 715/738 |
| 2003/0033369 | A1 * | 2/2003 | Bernhard ..................... 709/203 |
| 2004/0177335 | A1 * | 9/2004 | Beisiegel et al. ............ 717/102 |
| 2005/0216600 | A1 * | 9/2005 | Maron ........................ 709/236 |

* cited by examiner

*Primary Examiner*—Andy Ho
(74) *Attorney, Agent, or Firm*—Blakely, Sokoloff, Taylor & Zafman LLP (57) ABSTRACT

A system and method to provide an interface to access transaction management services. The interface is declared and the transaction management services are bound to the interface. The transaction management services provide services for managing related transactions executing on remote nodes in an enterprise system. The transaction management services are published to components of the application server executing on at least one of the remote nodes.

39 Claims, 8 Drawing Sheets

TRANSACTION POLYMORPHISM

TECHNICAL FIELD

This disclosure relates generally to software, and in particular but not exclusively, relates to a transaction interface for accessing transaction management services.

BACKGROUND INFORMATION

Figure 1:
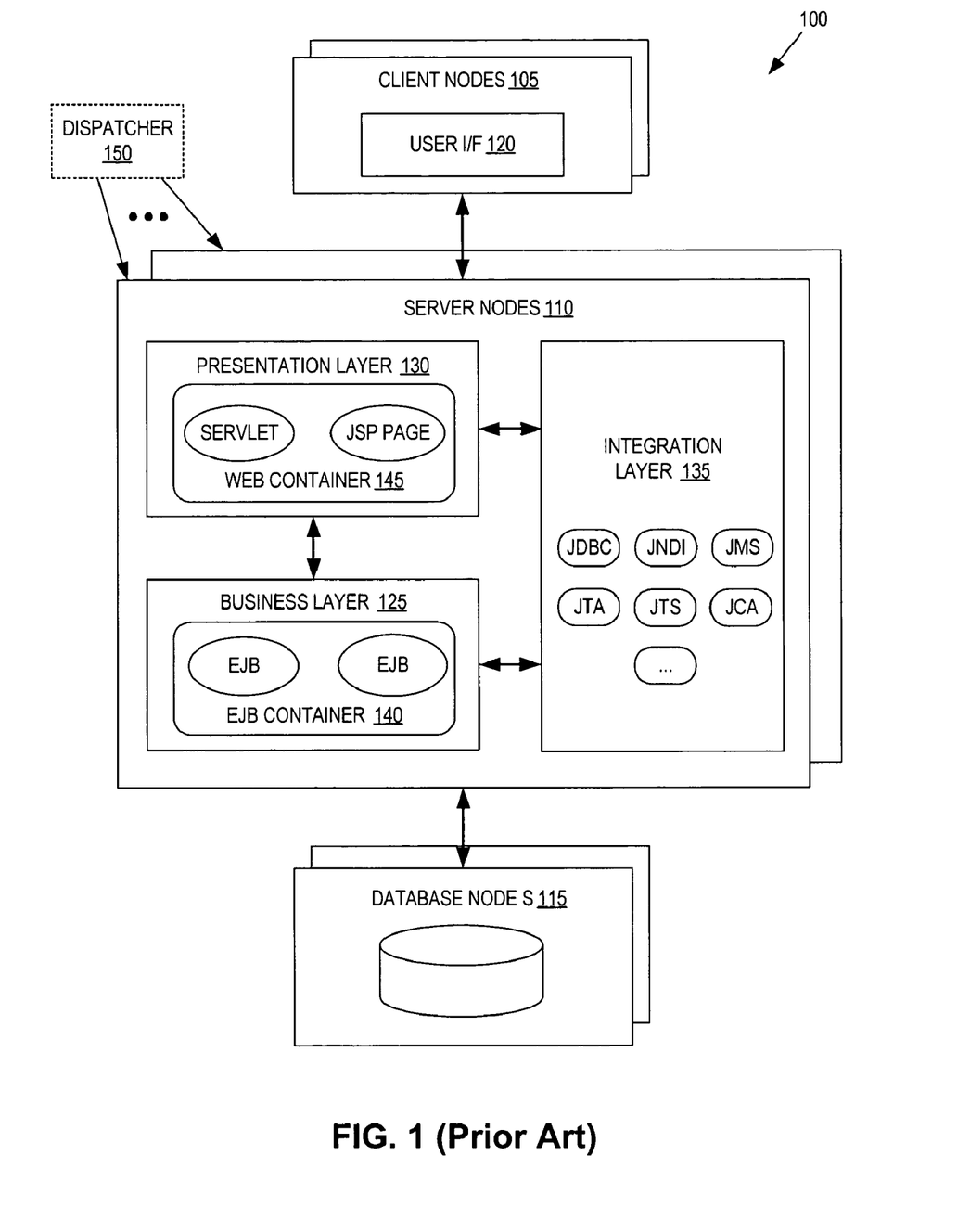
FIG. 1 is a block diagram illustrating an enterprise system.

FIG. 1 is a block diagram illustrating an enterprise system 100. Enterprise system 100 is a multi-tier architecture implemented using a variety of different technologies at each sublayer, including those based on the Java 2 Platform, Enterprise Edition™ ("J2EE") standard (e.g., J2EE Specification, Version 1.4), the Microsoft .NET standard, the Advanced Business Application Programming ("ABAP") standard developed by SAP AG, and the like.

Enterprise system 100 includes one or more client nodes 105 communicatively coupled to one or more server nodes 110, which are in turn communicatively coupled to one or more database nodes 115. A user interface 120 provides a graphical user interface ("GUI") to enable users of client nodes 105 to interact with database nodes 115 (e.g., submit queries, input data, etc.) through server nodes 110. User interface 120 may be a proprietary application or a standard application, such a web browser (e.g., Internet Explorer or Netscape Navigator).

Server nodes 110 each include a business layer 125, a presentation layer 130, and an integration layer 135, which together form subcomponents of an Application Server (e.g., WebAS by SAP AG). Business layer 125 provides the business logic of the Application Server, enabling complex business processes to be implemented. In a J2EE environment, business layer 125 may include one or more Enterprise JavaBean ("EJB") containers 140 each including one or more EJBs. The EJBs are Java based software modules that contain the actual business logic, while EJB container 140 encapsulates the EJBs in a Java based runtime environment that provides a host of common interfaces and services to the EJBs.

Presentation layer 130 describes the specific manner in which the results of business layer 125 are formatted for display on the user interface 120. The results may be formatted with aid of a web container 145 that supports both Servlets and JavaServer Pages ("JSPs"). The servlets provide server-side processing to generate the GUI and the JSPs are extensions of the Java servlet technology for providing dynamic content within the GUI.

Integration layer 135 ensures access to business functionalities from external resources. This is done using various services, connectors (middleware), communication protocols, and support for general data exchange formats (e.g., extensible markup language). For example, integration layer 135 may contain support for the following services: Java Database Connectivity ("JDBC") Application Programming Interface ("API"), the Java Naming and Directory Interface ("JNDI"), the Java Messaging Service ("JMS"), the Java Transaction Service ("JTS"), the Java Transaction API ("JTA"), the J2EE Connector Architecture ("JCA"), and the like.

Multiple server nodes 110 may be grouped together to form a cluster of server nodes 110. Each server node 110 may support its own Application Server providing a sort of distributed computing environment. A dispatcher 150 may be provided to implement a load-balancing mechanism distributing service requests from client nodes 105 among server nodes 110 within the cluster. For example, dispatcher 150 may implement a round-robin load-balancing mechanism. Dispatcher 150 may be one of server nodes 110 having the task of dispatching service requests among server nodes 110 of the cluster.

The service requests are processed by server nodes 110 and subsequently provided to database nodes 115. Database nodes 115 offer up the requested data to server nodes 110, which in turn process and format the results for display on user interfaces 120 of client nodes 105.

Managing transactions between server nodes 110 and/or server nodes 110 and database nodes 115 requires use of various transaction management services. These services include those defined by the JTA, JTS, and JCA specifications. However, current implementations of these services are hierarchical in nature—building on top of each other. As such, these services have low scalability and objectionable overhead, particularly during high load intervals.

SUMMARY OF INVENTION

A system and method for implementing a transaction interface within an application server of an enterprise system are described herein. The transaction interface is declared within the application server. Transaction management services defined by multiple transaction management specifications are bound to the transaction interface and accessible through the transaction interface. The transaction management interface provides a scalable and efficient technique for accessing multiple different transaction management services.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing a transaction interface within an application server of an enterprise system are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
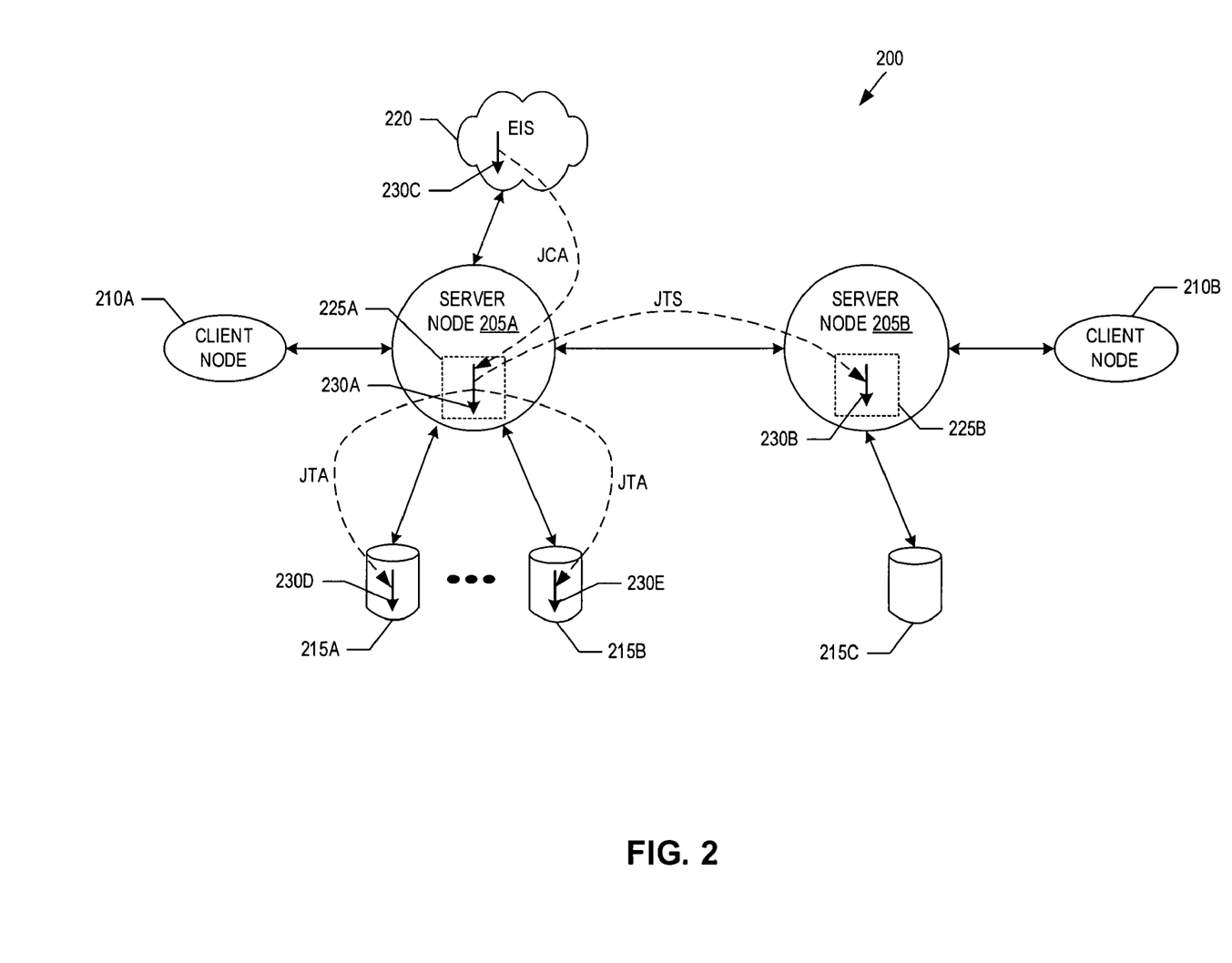
FIG. 2 is a diagram illustrating related transactions executing on remote nodes of an enterprise system, in accordance with an embodiment of the present invention.

FIG. 2 is a diagram of an enterprise system 200 illustrating related transactions executing on remote nodes, in accordance with an embodiment of the present invention. The illustrated embodiment of enterprise system 200 includes server nodes 205A and 205B (collectively 205), client nodes 210A and 210B (collectively 210), database nodes 215A, B, and C (collectively 215), and an enterprise information system ("EIS") 220. It should be appreciated that more or less server nodes, client nodes, database nodes, and EISs may be interconnected in a variety of other configurations within enterprise system 200.

Typically, each server node 205 includes its own copy of an application server 225A and 225B (collectively 225). In one embodiment, application servers 225 include similar components and functionality as described in connection with FIG. 1, but adapted to include a transaction interface, as described below.

In one embodiment, application server 225A executing on server node 205A may execute a transaction 230A that is related to a transaction 230B executing in application server 225B. Related transactions 230 are transactions executing on remote nodes that perform related tasks. Related transactions 230 represent a global wrapper for all transactions running on nodes of enterprise system 200 whose resources are associated with transactional logic of the initiating node. Related transactions may enable corresponding data to be updated on remote nodes, according to the ACID (Atomicity, Consistency, Isolation, Durability) characteristics. Transaction 230A may be initiated by a component of application server 210A (e.g., a container) or may be initiated by an application. The application may be executing on client node 210A or on server node 205A itself. Once transaction 230A is initiated on server node 205A, it may be propagated to server node 205B as related transaction 230B. Related transactions (e.g., 230A and 230B) may be collectively referred to as a global transaction.

Propagating and executing related transactions on remote nodes is accomplished using various transaction management services. In the case of propagating transaction 230A from server node 205A to server node 205B as transaction 230B, the related transactions can be executed and managed with aid of transaction management services defined by a Java Transaction Service ("JTS") Specification published by Sun Microsystems, Inc., (e.g., JTS Specification, Version 1.0, Dec. 1, 1999). JTS uses the Common Object Request Broker Architecture ("CORBA"), which defines a standard mechanism for using the Internet InterORB Protocol ("IIOP") to generate and propagate transactions between transaction managers executing within remote application servers (e.g., application servers 210A and 210B). JTS implements a Java mapping of the Object Transaction Service ("OTS") Specification published by the Object Management Group ("OMG") (e.g., OTS Specification, Version 1.1).

In one embodiment, transaction 230A may be related to a transaction 230C executing within EIS 220. Transaction 230C can be propagated from EIS 220 to application server 225A as transaction 230A to perform related tasks within application server 225A using transaction management services defined by a J2EE Connector Architecture ("JCA") Specification published by Sun Microsystems, Inc. (e.g., JCA Specification, Version 1.5, November 2003). JCA provides integration of legacy EIS and proprietary EIS into enterprise system 200. JCA defines standard transaction contracts that allow connectivity between EIS 220 and server node 205A.

In one embodiment, transaction 230A may be related to transactions 230D and 230E executing within database 215A and 215B, respectively. Transaction 230A can propagate to databases 215A and 215B as transactions 230D and 230E to perform related tasks within each of databases 215A and 215B using transaction management services defined by a Java Transaction API ("JTA") Specification published by Sun Microsystems, Inc. (e.g., JTA Specification, Version 1.0.1B, Nov. 1, 2002). The JTA Specification Version 1.0.1B specifies high-level interfaces between a transaction manager of an application server (e.g., application server 225A) and other parties involved in a distributed transaction system (e.g., an application, an application server, resource manager, etc.). Thus, an application executing on client node 210A can initiate transaction 230A within application server 225A, which is propagate to databases 215A and 215B using transaction management services defined by the JTA Specification. For example, a user of client node 210A may input new data (e.g., name, address, phone number, etc.), which is then updated into each of databases 215A and 215B via transactions 230D and 230E.

In a distributed environment, such as enterprise system 200, where data is maintained on a variety of distributed nodes, special care is taken to ensure reliability and continuity of data. When related transactions are initiated and executing within enterprise system 200 one of two events will occur— either all related transactions committed to completion or all transactions are rolled back and the data of all the nodes returned to an initial state. In other words, data will be made persistent in all nodes participating in a related transactions following the ACID characteristics. Typically, a commit or rollback command is issued by the application or container initiating the related transaction and signifies the termination of the related transactions. Executing one of a commit or rollback command ensures that all updates are implemented or no update is implemented. Thus, the commit and rollback commands maintain continuity and reliability of server nodes 205, databases 215, and EIS 220.

Figure 3:
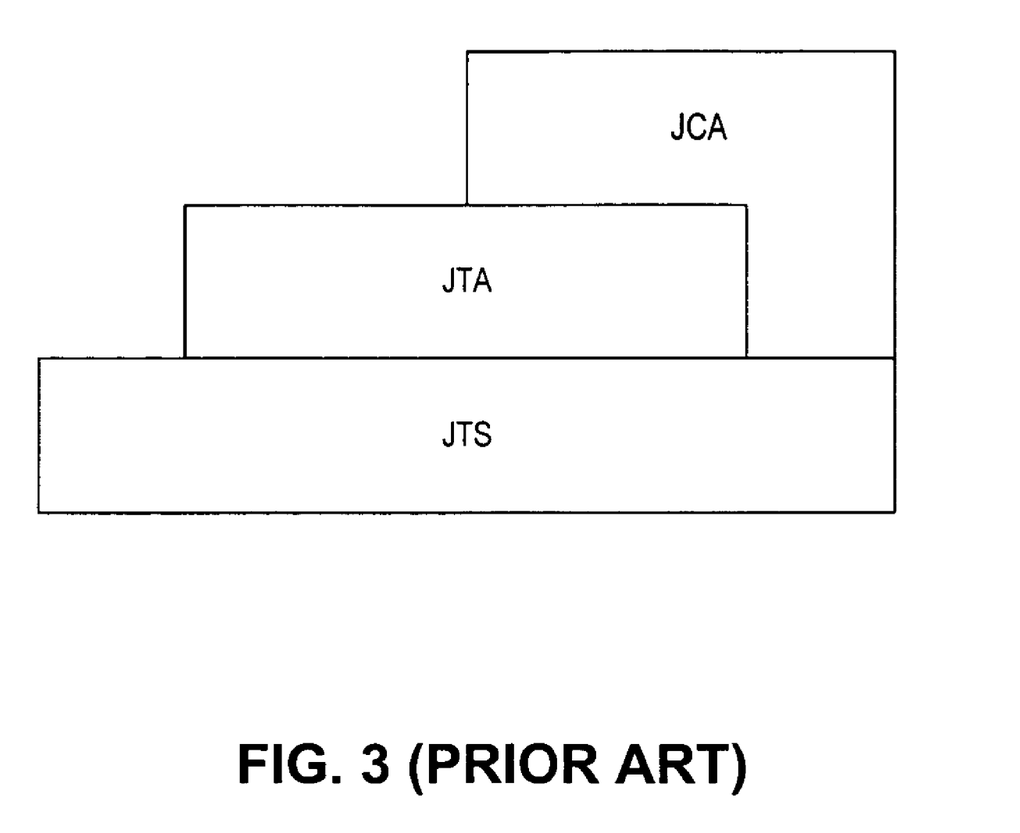
FIG. 3 is an abstract illustration depicting how transaction services are currently hierarchically dependent upon each other to manage related transactions executing on remote nodes.

FIG. 3 is an abstract illustration of a hierarchical interdependence between the transaction management services defined by JTS, JTA, and JCA as implemented by known techniques. As can be seen from FIG. 3, transaction management services provided by JTA rely on the transaction management service provided by JTS. Similarly, the transaction management services provided by JCA rely on a portion of both those provided by JTS and JTA. As such, the transaction management services defined by JTS, JTA, and JCA are currently accessible in an inefficient manner that is not scalable and results in unnecessary overhead, particularly during high usage loads.

For example, known OTS, JTA, and JCA implementations manage all transactions using coordinator and terminator objects, even though only transactions propagated using transaction management services defined by the JTS Specification require use of the coordinator and terminator objects. The coordinator object provides operations for managing a propagated transaction during its lifecycle (e.g., registering synchronizations, registering resources, getting status, etc.). The coordinator object is a CORBA object propagated from one server node to another server node through IIOP. The terminator object provides operations for ending the transaction (e.g., commit or rollback). Due to the hierarchical implementation of transaction management services defined by the JTS, JTA, and JCA Specifications, current implementations, in general, generate a coordinator object and a terminator object for each type of propagated transaction. Unnecessarily generated coordinator and terminator objects result in unnecessary overhead.

Figure 4:
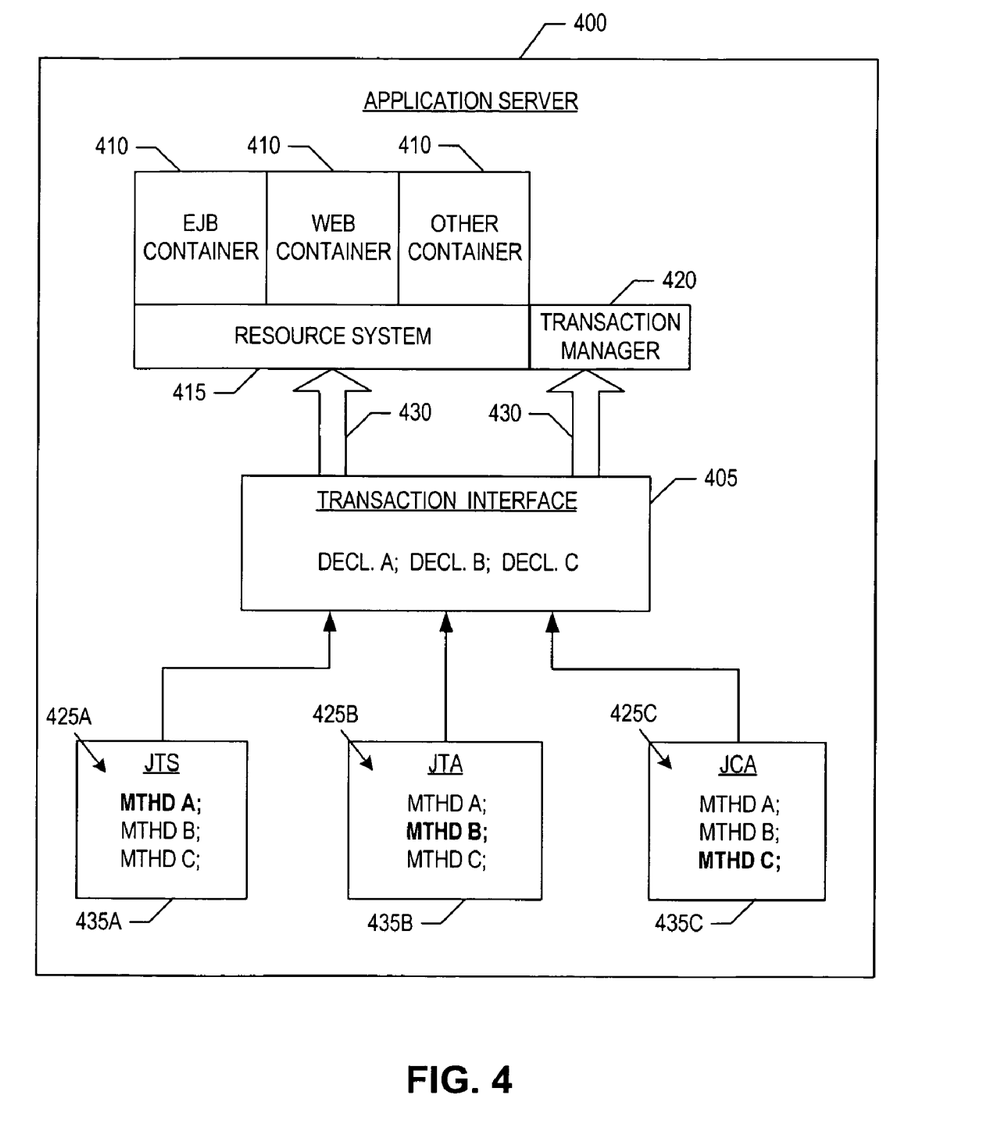
FIG. 4 is a block diagram illustrating an application server including a transaction interface for accessing transaction services to manage related transactions executing on remote nodes, in accordance with an embodiment of the present invention.

FIG. 4 is a block diagram illustrating an application server 400 including a transaction interface for efficiently accessing transaction management services, in accordance with an embodiment of the present invention. The illustrated embodiment of application server 400 includes a transaction interface 405, containers 410, a resource system 415, a transaction manager 420, and transaction management services 425A, B, and C (collectively 425).

As described in the JTA Specification, Version 1.0.1B, transaction manager 420 provides services and management functions to support transaction demarcation, transactional resource management, synchronization, and transaction context propagation. Resource system 415 provides specific contracts for interaction between containers 410 from one side and other contracts and services for interaction with JDBC Connectors, JMS Connectors, and various other connector container services from the other. In particular, resource system 415 provides mechanisms for pooling connections, authentication, and other runtime information regarding connections and transactions in which it is involved.

Transaction management services 425 are all bound to transaction interface 405. In turn, transaction interface 405 publishes access to transaction management services 425, illustrated as arrows 430, to resource system 415 and transaction manager 420. In this manner, resource system 415 and transaction manager 420 see only a single global type transaction capable of all the functionality provided by the JTS, JTA, and JCA Specifications combined. Further, transaction interface 405 provides a single point of access for all transaction management services 425. As a result, resource system 415 and transaction manager 420 need not concern themselves with the particular type of transaction (e.g., JTS, JTA, JCA, or the like) being implemented.

In one embodiment, transaction management services 425 are bound to transaction interface 405 by declaring the methods defined by each transaction management specification within transaction interface 405. Thus, if the JTS Specification defines a method A, then method A is declared within transaction interface 405 and implemented within a class 435A defined by the JTS Specification. If the JTA Specification defines a method B, then method B is declared within transaction interface 405 and implemented within a class 435B defined by the JTA Specification. If the JCA Specification defines a method C, then method C is declared within transaction interface 405 and implemented within a class 435C defined by the JCA Specification.

However, binding methods A, B, and C to transaction interface 405 further allows the methods A, B, and C to be replicated (or cross-implemented) into each of classes 435. In one embodiment, the replicated methods may be modified or specially tailored for the particular class 435A, B, or C when cross-implemented. Accordingly, method B implemented within class 435A may not be identical to method B implemented in class 435C, but rather, specially tailored or optimized for execution in connection with OTS type transaction propagation.

Thus, incorporating transaction interface 405 into the architecture of application server 400, provides a technique to exchange transaction management features among transactions of different types, and as such, implements a sort of polymorphism with transaction management services. Transaction interface 405 provides a generic transaction interface to access the methods declared therein (a.k.a. virtual methods). When a component of application server 400 (e.g., resource system 415, containers 410, or transaction manager 420) interacts with transaction interface 405 it need not have intimate knowledge of the implementation details below transaction interface 405. Rather, the component simply uses the functionality provided by transaction interface 405 without interest of the type, kind, class, or implementation details of the particular functionality exploited (e.g., transaction management service 425). Abstracting the implementation details of transaction management services 425 from a user of transaction management services 425 simplifies how containers 410, resource system 415, and transaction manager 420 manage transactions.

Figure 5:
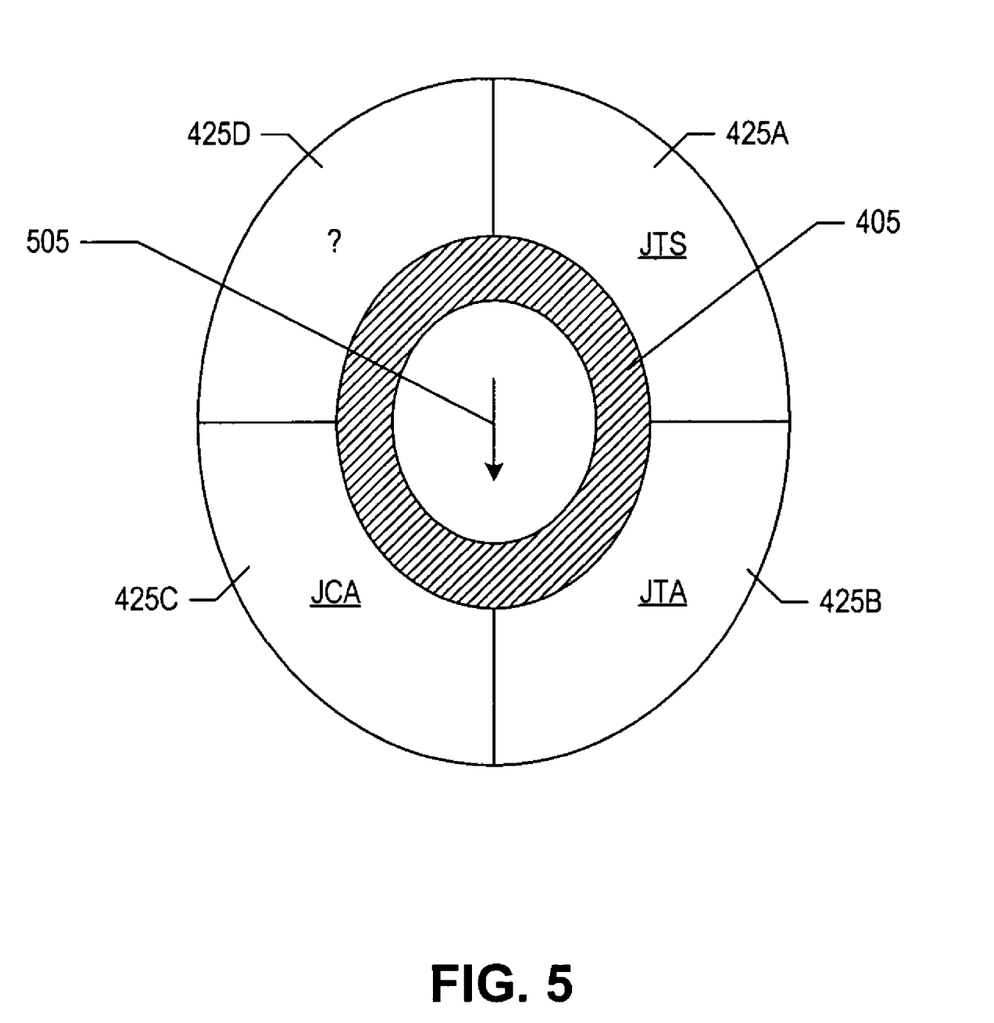
FIG. 5 is a diagram illustrating how a transaction interface provides access to transaction services without hierarchical interdependence, in accordance with an embodiment of the present invention.

FIG. 5 is a diagram symbolically illustrating how transaction interface 405 provides access to transaction management services 425 without hierarchical interdependence, in accordance with an embodiment of the present invention. A transaction 505 (e.g., one of transactions 230) can access each of transaction management services 425 in a non-hierarchical manner. Since transaction management services 425 have been decoupled from each other, transaction 505 can be managed and propagated from one network node to another without generating redundant objects (e.g., a coordinator object or terminator object). Rather, containers 410, resource system 415, and transaction manager 420 can work directly with transaction interface 405. Thus, transaction interface 405 transforms the hierarchical architecture illustrated in FIG. 3 to a flat architecture illustrated in FIG. 5. Furthermore, transaction interface 405 provides a scalable technique for adding other transaction management services 425D, which may be develop in the future.

A few of the key benefits derived from introducing transaction interface 405 into the architecture of application server 400 are now summarized. (1) Transaction interface 405 abstracts implementation details of transaction management services thereby simplifying transaction management logic within user entities (e.g., containers 410, resource system 415, and transaction manager 420) of the transaction management services. (2) Transaction interface 405 provides flat/direct access to transaction management services 425 ameliorating unnecessary use of redundant transaction objects (e.g., terminator and coordinator objects) thereby reducing transaction management overhead. (3) Transaction interface 405 is scalable providing a simply technique to expand on and add additional or future developed transaction management services with minimal alteration to existing architecture. (4) Transaction interface 405 enables cross-implementation or exchange of features between various different types or classes of transaction management services. (5) Finally, introduction of transaction interface 405 into currently existing application server architectures does not conflict with current specifications and recommendations for transaction management.

Figure 6:
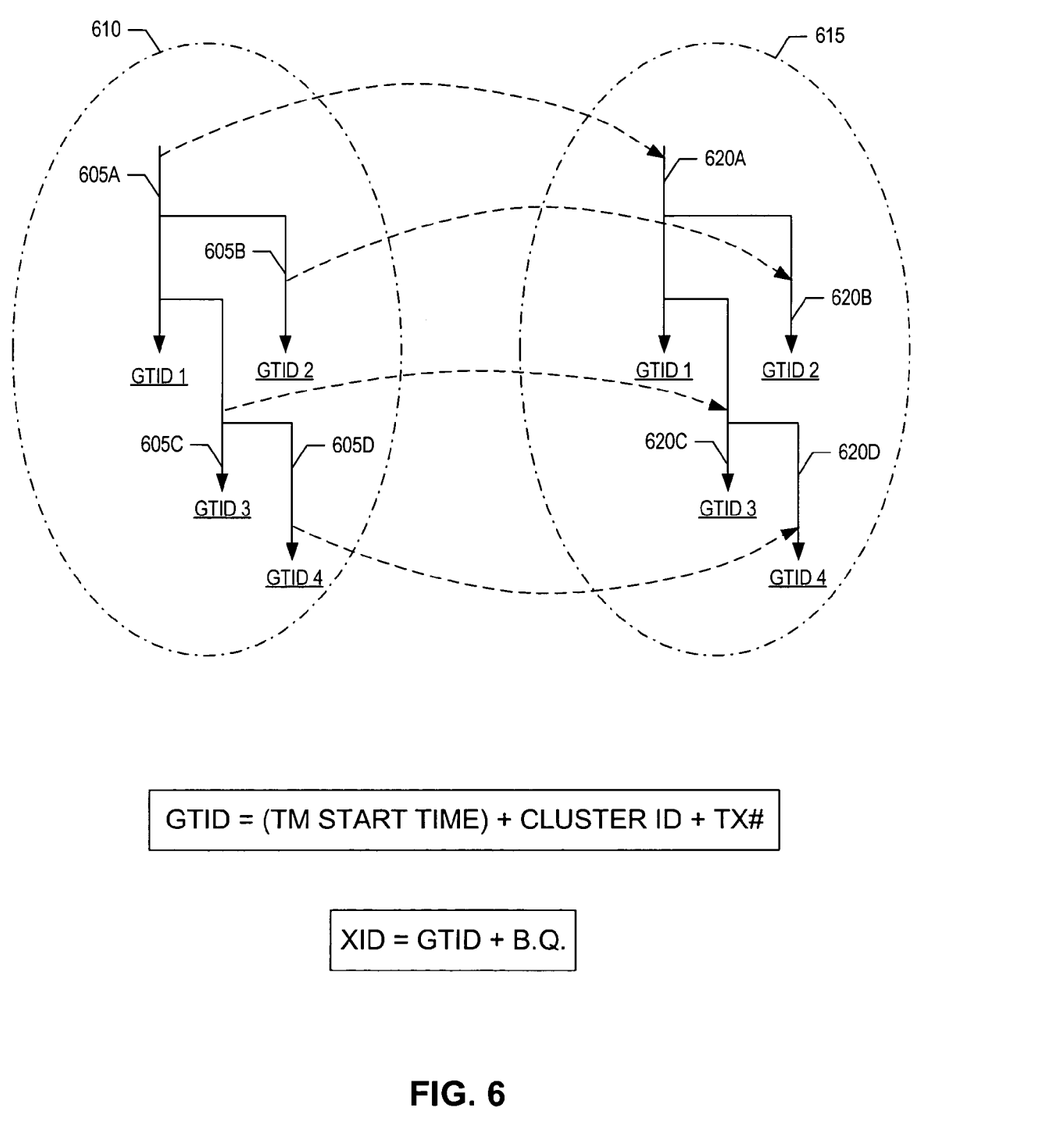
FIG. 6 is a diagram illustrating related transactions executing on remote nodes distinguishable using a global transaction identifier, in accordance with an embodiment of the present invention.

One important aspect of transaction management is to guarantee that related transactions are uniquely identifiable on any particular network node from all other transactions. FIG. 6 illustrates related transactions executing on remote nodes being uniquely identified using global transaction identifiers, in accordance with an embodiment of the present invention. In the illustrated embodiment, transactions 605A, B, C, and D (collectively 605), each having a global transaction identifier ("GTID"), are initiated on a network node 610 (e.g., server node 205A). Transactions 605 are propagated from network node 610 to a remote network node 615 and establish corresponding related transactions 620A, B, C, and D (collectively 620) having identical GTIDs. Collectively, related transactions are referred to as global transactions. For example, transaction 605A and 620A are a global transaction having a single GTID 1.

In one embodiment, transactions 605 may be initiated on network node 610 in response to an application executing on a client node coupled to network node 610 (e.g., client node 210A). In other embodiments, transactions 605 may be initiated by applications or a container executing on network node 610 itself (e.g., containers 410 or EJBs of EJB container 140). Once a global transaction has been initiated, all resources enlisted by the global transaction have one and the same GTID. As illustrated, applications and/or containers may initiate a plurality of global transactions or cascading transactions to accomplish a plurality of related tasks. Each global transaction enlists resources on the particular network node to accomplish its tasks.

In one embodiment, a GTID includes a start time value of the transaction manager (e.g., transaction manager 420) executing on the network node from which the global transaction was initiated. In one embodiment, the GTID includes a cluster identifier ("ID") which is a unique number identifying a network node within a cluster of nodes. The cluster ID identifies the network node originating the global transaction (e.g., network node 610). Including a cluster ID within the GTID enables one to determine which network node originated a particular global transaction. In one embodiment, the GTID includes a transaction number ("TX#"). The TX# is a unique number identifying each global transaction initiated by a particular transaction manager session. In one embodiment, the TX# is simply a counter incremented by one for each new global transaction initiated by a particular transaction manager. Thus, in one embodiment, the GTID is defined as:

$$GTID=(TmStartTime)+ClusterID+TX\#. \quad (1)$$

A GTID may be combined with a branch qualifier ("BQ") to generate a transaction ID ("XID"), where $$XID=GTID+BQ. \quad (2)$$

The BQ is one part of the XID specified by the X/Open standards consortium. The BQ differs for each resource manager (not illustrated) of an application server participating in the particular global transaction.

A GTID uniquely identifies one global transaction from another to ensure confusion between global transactions does not occur. For example, suppose that the GTID 1 of transaction 620A were not unique from the GTID 2 of transaction 620B. In this scenario, if an application server executing on network node 610 created a terminator object and propagated the terminator object to network node 615 to signify completion of related transactions 605A and 620A, the application server executing on network node 615 may become confused and wrongfully associate the terminator object with transaction 620B. As such, transaction 620B may prematurely terminate.

The process explained below is described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 7:
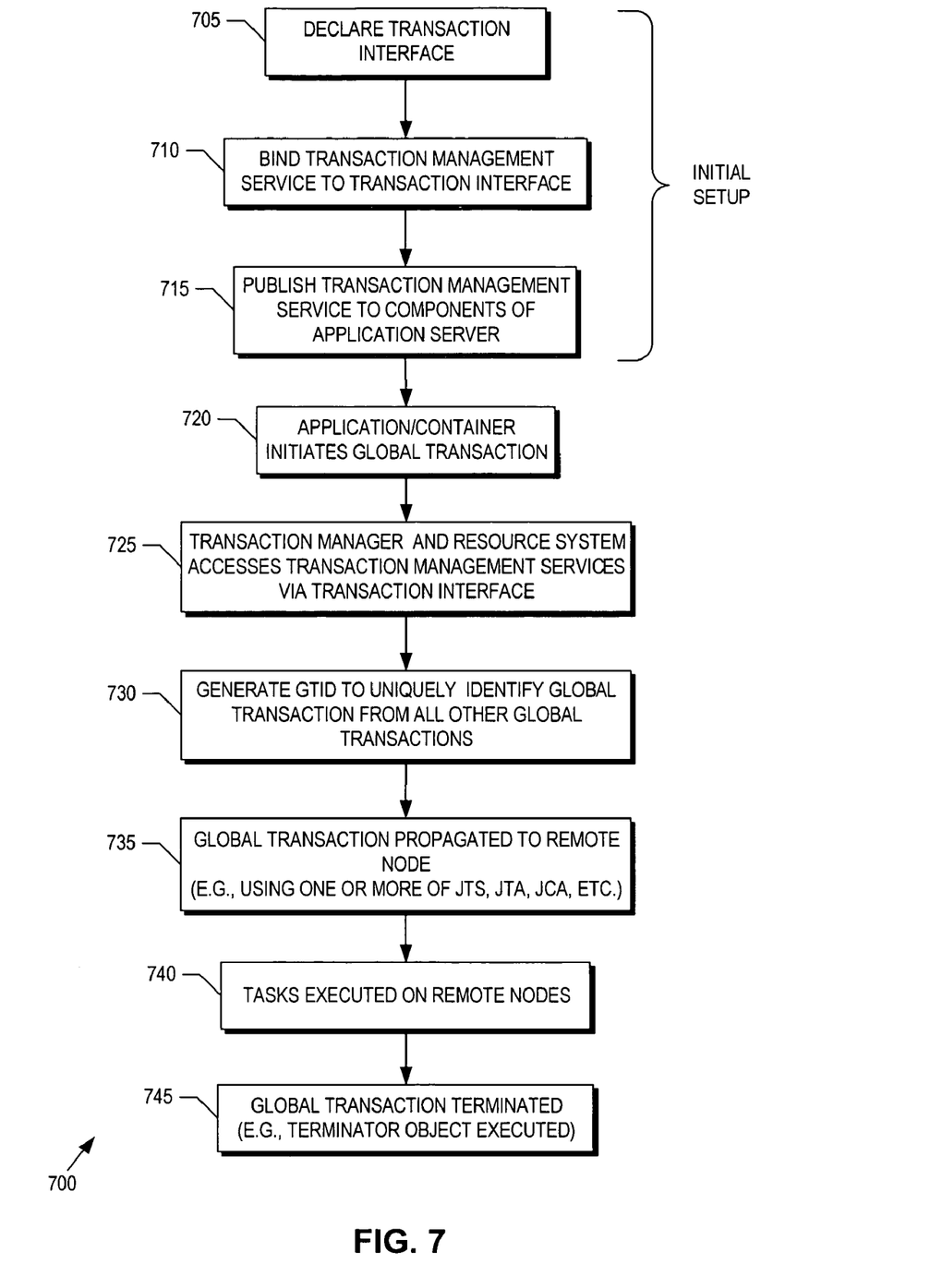
FIG. 7 is a flow chart illustrating a process for executing related transactions on remote nodes using transaction interfaces, in accordance with an embodiment of the present invention.

FIG. 7 is flow chart illustrating a process 700 for implementing transaction interface 405 for executing related transactions (e.g., transactions 230) on remote nodes (e.g., server nodes 205, database nodes 215, and EIS 220), in accordance with an embodiment of the present invention.

In a process block 705, transaction interface 405 is declared. In a process block 710, transaction management services 425 are bound to transaction interface 405. In one embodiment, transaction management services 425 are bound to transaction interface 405 by declaring methods defined by various transaction management specifications (e.g., JTS Specification, JTA Specification, JCA Specification, and the like). In one embodiment, the methods provide transaction management services 425. In a process block 715, transaction interface 405 publishes transaction management services 425 to components of application server 400. It should be appreciated that process blocks 705-715 are initial setup processes for establishing transaction interface 405 upon loading application server 400.

In a process 720, an application (either executing on one of client nodes 210 or server nodes 205) or one of containers 410 initiates a global transaction to accomplish related tasks on remote nodes (e.g., update phone number, address, and name stored on remote database nodes 215A and 215B). For example, in the case of a JTA type global transaction, the application/container may look up a user transaction object from the JNDI and invoke a begin method of the user transaction object. In response, the begin method will trigger transaction manager 420 to start the global transaction.

In a process block 725, either transaction manger 420 or resource system 415 accesses transaction management services 425 via transaction interface 405 to commence the global transaction (e.g., transaction 230A). In a process block 730, a GTID is generated and assigned to the global transaction. As described above, the GTID uniquely identifies one global transaction from another to ensure confusion does not occur. In one embodiment, the GTID is generated by transaction manager 420.

In a process block 735, the global transaction is propagated to a designated remote node using transaction management services 425 defined by the transaction management specifications (e.g., JTS, JTA, and JCA). Once propagated, a related transaction (i.e., the other half of the global transaction) is established and executed on the remote node (e.g., transaction 230B, C, D, or E).

In a process block 740 the related transactions execute their respective tasks on their respective remote nodes. Finally, in a process block 745, the global transaction is terminated. In the case of a global transaction propagated using transaction management services defined by the JTS Specification, a terminator object may be created to terminate the related transactions of the global transaction.

Figure 8:
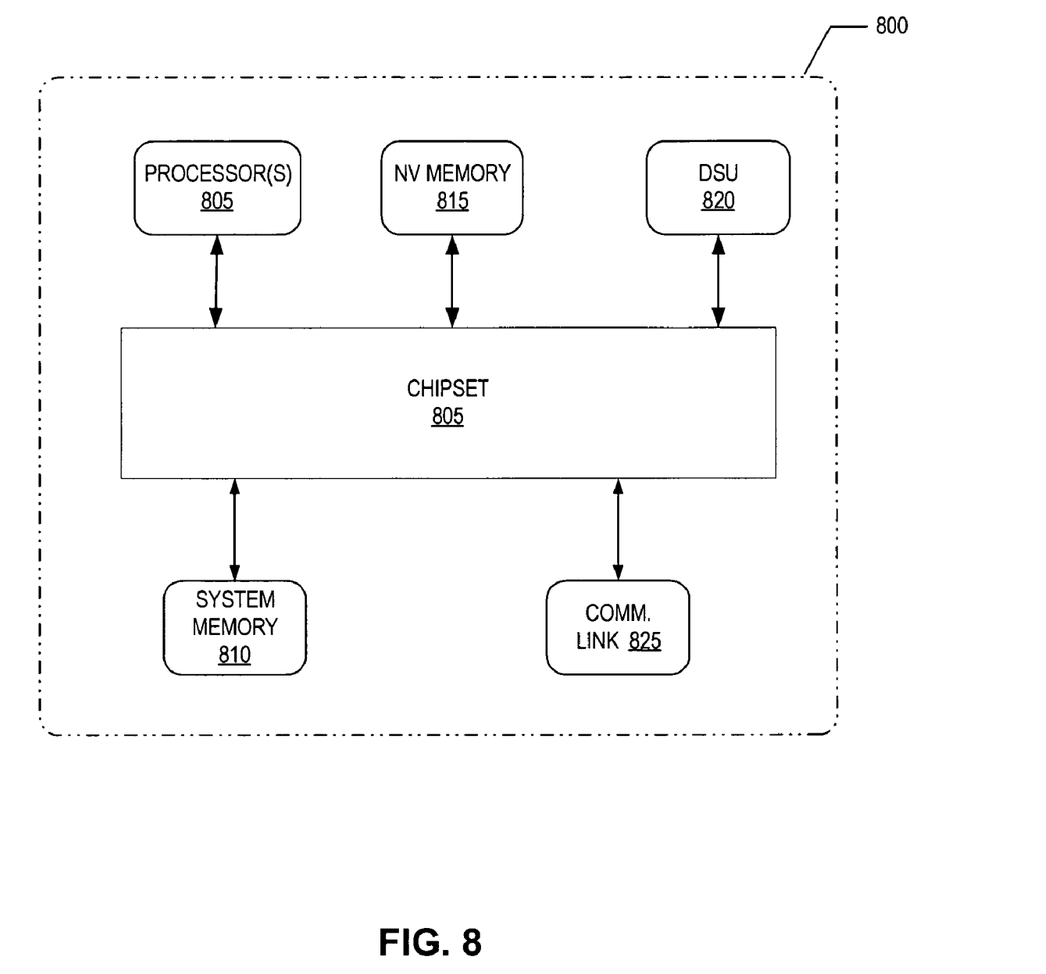
FIG. 8 is a block diagram of a demonstrative processing system to implement embodiments of the present invention.

FIG. 8 is a block diagram illustrating a demonstrating processing system 800 to implement embodiments of the present invention. The illustrated embodiment of processing system 800 includes one or more processors (or central processing units) 805, system memory 810, nonvolatile ("NV") memory 815, a data storage unit ("DSU") 820, a communication interface 825, and a chipset 830. The illustrated processing system 800 may represent any computing system including a client computer, a desktop computer, a notebook computer, a workstation, a handheld computer, a server, a blade server, a database, and the like. Embodiments of processing system 800 may be used to implement one or more of server nodes 205, database nodes 215, and/or EIS 220.

The elements of processing system 800 are interconnected as follows. Processor(s) 805 is communicatively coupled to system memory 810, NV memory 815, DSU 820, and communication interface 825, via chipset 830 to send and to receive instructions or data thereto/therefrom. In one embodiment, NV memory 815 is a flash memory device. In other embodiments, NV memory 815 includes any one of read only memory ("ROM"), programmable ROM, erasable programmable ROM, electrically erasable programmable ROM, or the like. In one embodiment, system memory 810 includes random access memory ("RAM"). DSU 820 represents any storage device for software data, applications, and/or operating systems, but will most typically be a nonvolatile storage device. DSU 820 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 820 is illustrated as internal to processing system 800, DSU 820 may be externally coupled to processing system 800. Communication interface 825 may couple processing system 800 to a network such that processing system 800 may communicate over the network with one or more other machines (e.g., server nodes 205, database nodes 215, or EIS 220). Communication interface 825 may include a modem, an Ethernet card, Universal Serial Bus ("USB") port, a wireless network interface card, or the like.

It should be appreciated that various other elements of processing system 800 have been excluded from FIG. 8 and this discussion for the purposes of clarity. For example, processing system 800 may further include a graphics card, additional DSUs, other persistent data storage devices (e.g., tape drive), and the like. Chipset 830 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 830. Correspondingly, processing system 800 may operate without one or more of the elements illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method for accessing transaction management services, the method comprising:
    declaring a transaction interface within an application server, the transaction interface providing a single point of access to multiple types of transaction management services for managing related transactions on remote nodes in an enterprise system;
    binding the multiple types of transaction management services for managing related transactions on remote nodes in the enterprise system to the transaction interface, the related transactions originating on one of the remote nodes by a transaction manager executing on one of the remote nodes; and
    publishing the multiple types of transaction management services to components of an application server executing on one of the remote nodes.

2. The method of claim 1, further comprising initiating the related transactions by accessing the multiple types of transaction management services through the transaction interface.

3. The method of claim 2, wherein binding the multiple types of transaction management services to the transaction interface comprises:
    declaring methods within the transaction interface; and
    implementing the methods having transaction class types defined by multiple transaction management specifications that respectively correspond to multiple types of transaction management services.

4. The method of claim 3, wherein implementing the methods comprises:
    creating an object having one of the transaction class types in response to the transaction manager of the application server, the object including at least one of the methods; and
    executing the at least one of the methods of the object.

5. The method of claim 4, wherein the transaction management specifications include at least one of an Object Transaction Service ("OTS") specification, a Java Transaction Service ("JTS") specification, a Java Transaction Application Programming Interface ("JTA") specification, and a J2EE Connector Architecture ("JCA") specification.

6. The method of claim 4, wherein the application server comprises a web application server.

7. The method of claim 1, further comprising:
    committing the related transactions on the remote nodes, if both of the related transactions are successful; and
    rolling back the related transactions on the remote nodes, if at least one of the related transactions fails.

8. The method of claim 1, wherein the enterprise system comprises one of a Java based enterprise system and a .NET framework enterprise system.

9. The method of claim 1, wherein the remote nodes each comprise one of a server node, an enterprise information system node, and a database node.

10. The method of claim 1, further comprising:
generating a global transaction identifier ("GTID"), the GTID based, at least in part, on a startup time of the transaction manager executing on one of the remote nodes originating the related transactions; and
assigning the GTID to the related transactions, the GTID to distinguish the related transactions from other transactions.

11. The method of claim 10, wherein GTID is further based, at least in part, on a cluster identifier uniquely identifying the one of the remote nodes originating the related transactions and a transaction number representing a count of transactions initiated by the transaction manager.

12. A machine-accessible medium that provides instructions that, if executed by a machine, will cause the machine to perform operations comprising:
declaring a transaction interface within an application server, the transaction interface providing a single point of access to multiple types of transaction management services for managing related transactions on remote nodes in an enterprise system;
binding the multiple types of transaction management services respectively defined by multiple transaction management specifications to the transaction interface, the related transactions originating on one of the remote nodes by a transaction manager executing on one of the remote nodes; and
accessing the multiple types of transaction management services through the transaction interface.

13. The machine-accessible medium of claim 12, wherein binding the multiple types of transaction management services to the transaction interface comprises:
declaring methods within the transaction interface to be accessible from the transaction interface; and
implementing the methods having transaction class types defined by multiple transaction management specifications that respectively correspond to multiple types of transaction management services.

14. The machine-accessible medium of claim 13, further comprising initiating the related transactions by invoking at least one of a transaction manager and a resource system of the application server in response to one of a container of the application server and an application.

15. The machine-accessible medium of claim 14, wherein accessing the multiple types of transaction management services through the transaction interface comprises creating an object having one of the transaction class types in response, to at least one of the transaction manager and the resource system accessing the multiple types of transaction management services through the transaction interface, the object including at least one of the methods.

16. The machine-accessible medium of claim 12, further providing instructions that, if executed by the machine, will cause the machine to perform further operations, comprising:
propagating a first one of the related transactions from a first one of the remote nodes to a second one of the remote nodes; and
managing the remote transactions using the multiple types of transaction management services accessed through the transaction interface.

17. The machine-accessible medium of claim 16, wherein the transaction management specifications comprise at least one of an Object Transaction Service ("OTS") specification, a Java Transaction Service ("JTS") Specification, a Java Transaction Application Programming interface ("JTA") Specification, and a Java 2 Enterprise Edition ("J2EE") Connector Architecture ("JCA") Specification.

18. The machine-accessible medium of claim 16, further providing instructions that, if executed by the machine, will cause the machine to perform further operations, comprising:
generating a global transaction identifier ("GTID"), the GTID based, at least in part, on a startup time of a transaction manager executing on the first one of the remote nodes originating the related transactions; and
assigning the GTID to the first one of the related transactions prior to propagating the first one of the related transactions to the second one of the remote nodes, the GTID to distinguish the related transactions from other transactions.

19. The machine-accessible medium of claim 18, wherein the GTID is further based, at least in part, on a cluster identifier uniquely identifying the first one of the remote nodes from other nodes in a cluster of nodes.

20. The machine-accessible medium of claim 19, wherein the GTID is further based, at least in part, on transaction number, the transaction number representing a count of transactions initiated by the transaction manager executing on the first one of the remote nodes.

21. The machine-accessible medium of claim 12, wherein the remote nodes each comprise one of a server node, an enterprise information system node, and a database node.

22. The machine-accessible medium of claim 12, wherein the enterprise system comprises one of a Java based enterprise system and a .NET framework enterprise system and wherein in the application server comprises a web application server.

23. An apparatus, comprising:
a processor; and
logic executable by the processor to:
declare a transaction interface within an application server, the transaction interface providing a single point of access to multiple types of transaction management services for managing related transactions on remote nodes in an enterprise system;
bind the multiple types of transaction management services to the transaction interface, the related transactions originating on one of the remote nodes by a transaction manager executing on one of the remote nodes;
initiate the related transactions by one of a container of the application server and an application; and
access the multiple types of transaction management services through the transaction interface.

24. The apparatus of claim 23, wherein the logic is further to:
propagate a first one of the related transactions from a first one of the remote nodes to a second one of the remote nodes; and
manage the related transactions propagated to the remote nodes using the multiple types of transaction management services accessed through the transaction interface.

25. The apparatus of claim 24, wherein the transaction management services comprise services defined by at least one of an Object Transaction Service ("OTS") specification, a Java Transaction Service ("JTS") Specification, a Java Transaction Application Programming Interface ("JTA") Specification, and a Java 2 Enterprise Edition ("J2EE") Connector Architecture ("JCA") Specification.

26. The apparatus of claim 24, wherein the logic is further to:
generate a global transaction identifier ("GTID"), the GTID based, at least in part, on a startup time of a transaction manager executing on the first one of the remote nodes originating the related transactions; and assign the GTID to the first one of the related transactions prior to propagating the first one of the related transactions to the second one of the remote nodes, the GTID to distinguish the related transactions from other transactions.

27. The apparatus of claim 26, wherein the GTID is further based, at least in part, on a cluster identifier uniquely identifying the first one of the remote nodes from other nodes in a cluster of nodes.

28. The apparatus of claim 27, wherein the GTID is further based, at least in part, on transaction number, the transaction number representing a count of transactions initiated by the transaction manager executing on the first one of the remote nodes.

29. The apparatus of claim 23, wherein the enterprise system comprises one of a Java based enterprise system and a .NET framework enterprise system and wherein in the application server comprises a web application server.

30. A system, comprising:
a first network node to execute an application server including a transaction interface, the transaction interface to provide a single point of access to multipley types of transaction management services of the application server to manage related transactions on remote network nodes of an enterprise system, the related transactions originating from the first network node by a transaction manager executing on the first network node; and
a second network node communicatively coupled to the first network node, the application server to propagate a first one of the related transactions from the first network node to the second network node using the multiple types of transaction management services accessed through the transaction interface to execute related tasks on each of the first and second network nodes.

31. The system of claim 30, wherein the application server further includes the transaction manager to initiate propagation of the first one of the related transactions in response to at least one of an application and a container of the application server, the transaction manager to access the multiple types of transaction management services through the transaction interface.

32. The system of claim 30, wherein the transaction management services comprise services defined by at least one of an Object Transaction Service ("OTS") specification, a Java Transaction Service ("JTS") Specification, a Java Transaction Application Programming interface ("JTA") Specification, and a Java 2 Enterprise Edition ("J2EE") Connector Architecture ("JCA") Specification.

33. The system of claim 31, wherein the application server is further to generate a global transaction identifier ("GTID"), the GTID based, at least in part, on a startup time of the transaction manager executing on the first one of the remote nodes originating the related transactions and to assign the GTID to the first one of the related transactions prior to propagating the first one of the related transactions to the second one of the remote nodes.

34. The system of claim 33, wherein the GTID is further based, at least in part, on a cluster identifier uniquely identifying the first one of the remote nodes from other nodes in a cluster of nodes and a transaction number representing a count of transactions initiated by the transaction manager executing on the first one of the remote nodes.

35. The system of claim 30, wherein the first network node comprises a server node and wherein the second network node comprises one of a server node, a database node, and an enterprise information system ("EIS").

36. A system, comprising:
means for executing an application server;
means for initiating a first transaction on the application server;
means for initiating transactions related to the first transaction, including means for initiating the related transactions on remote nodes in an enterprise system;
means for providing a single access point to multiple types of transaction management services respectively defined by multiple transaction management specifications, the multiple types of transaction management services to manage related transactions executing on remote nodes in the enterprise system, wherein the means to provide a single access point comprises means for binding the multiple types of transaction management services to a single interface;
means for publishing access to the multiple types of transaction management services to components of the application server; and
means for managing the related transactions executing on remote nodes using the multiple types of transaction management services accessible through the means to provide a single access point.

37. The system of claim 36, wherein the means for managing the related transactions executing on remote nodes includes:
means for initiating a first one of the related transactions;
means for propagating the first one of the related transactions from a first one of the remote nodes to a second one of the remote nodes; and
means for terminating the related transactions.

38. The system of claim 36, wherein the transaction management services comprise services defined by at least one of an Object Transaction Service ("OTS") specification, a Java Transaction Service ("JTS") Specification, a Java Transaction Application Programming Interface ("JTA") Specification, and a Java 2 Enterprise Edition ("J2EE") Connector Architecture ("JCA") Specification.

39. The system of claim 36, further comprising:
means for assigning a global transaction identifier ("GTID") to the related transactions to distinguish the related transactions from other transactions, the GTID based, at least in part, on a startup time of the means for managing the related transactions.

* * * * *